US010800424B2

(12) United States Patent
Sato et al.

(10) Patent No.: US 10,800,424 B2
(45) Date of Patent: Oct. 13, 2020

(54) DRIVER CONDITION DETECTION SYSTEM

(71) Applicant: TOYOTA JIDOSHA KABUSHIKI KAISHA, Toyota-shi, Aichi-ken (JP)

(72) Inventors: Jun Sato, Susono (JP); Kenichiroh Hara, Yokohama (JP); Junya Kasugai, Kakamigahara (JP); Koichiro Yamauchi, Nagaizumi-cho (JP); Kazuhiro Tomosue, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 22 days.

(21) Appl. No.: 16/180,131

(22) Filed: Nov. 5, 2018

(65) Prior Publication Data

US 2019/0135295 A1    May 9, 2019

(30) Foreign Application Priority Data

Nov. 9, 2017   (JP) ................................. 2017-216486

(51) Int. Cl.
*B60W 40/08* (2012.01)
*B60W 50/14* (2020.01)
*G06K 9/00* (2006.01)
*G06F 3/01* (2006.01)

(52) U.S. Cl.
CPC ............ *B60W 40/08* (2013.01); *B60W 50/14* (2013.01); *G06F 3/013* (2013.01); *G06K 9/0061* (2013.01); *G06K 9/00221* (2013.01); *G06K 9/00268* (2013.01); *G06K 9/00845* (2013.01); *B60W 2040/0818* (2013.01); *B60W 2050/143* (2013.01)

(58) Field of Classification Search
None
See application file for complete search history.

(56) References Cited

U.S. PATENT DOCUMENTS

| 5,748,109 | A  | * | 5/1998  | Kosaka   | G01C 21/3635 |
|           |    |   |         |          | 340/995.14   |
| 7,460,940 | B2 | * | 12/2008 | Larsson  | G06F 3/012   |
|           |    |   |         |          | 701/49       |
| 8,447,072 | B2 | * | 5/2013  | Takahashi| G08G 1/167   |
|           |    |   |         |          | 382/103      |

(Continued)

FOREIGN PATENT DOCUMENTS

JP   2012-058769 A    3/2012

*Primary Examiner* — Steven Lim
*Assistant Examiner* — Muhammad Adnan
(74) *Attorney, Agent, or Firm* — Sughrue Mion, PLLC (57) ABSTRACT

A driver condition detection system 1, 1' comprises a driver monitor camera 10 capturing an image of a face of a driver to generate a facial image of the driver, a facial information detecting part 21 detecting a facial orientation or a line of sight of the driver based on the facial image, a threshold value range setting part 22 setting a threshold value range allowed as the facial orientation or the line of sight, a driver condition judging part 23 judging that the driver is driving while distracted if the facial orientation or the line of sight is maintained outside of the threshold value range for a predetermined time period or more, and a road discriminating part 24 discriminating a shape of a road ahead of the vehicle 80. The threshold value range setting part expands the threshold value range according to the shape of the road.

7 Claims, 9 Drawing Sheets

(56) References Cited

U.S. PATENT DOCUMENTS

| | | | | |
|---|---|---|---|---|
| 8,519,853 B2* | 8/2013 | Eskandarian | B60K 28/066 | 340/575 |
| 8,687,063 B2* | 4/2014 | Hsieh | B60Q 9/008 | 348/113 |
| 8,825,304 B2* | 9/2014 | Horvitz | G06N 20/00 | 701/45 |
| 8,866,896 B2* | 10/2014 | Hatakeyama | A61B 5/746 | 348/78 |
| 8,903,638 B2* | 12/2014 | Lin | G08G 1/0962 | 340/435 |
| 9,248,796 B2* | 2/2016 | Takahashi | B60R 21/00 | |
| 9,265,458 B2* | 2/2016 | Stack | A61B 5/4076 | |
| 9,380,976 B2* | 7/2016 | Stack | A61B 5/162 | |
| 9,398,144 B2* | 7/2016 | Philbin | H04M 1/72594 | |
| 9,734,402 B2* | 8/2017 | Jang | G06F 3/012 | |
| 10,120,438 B2* | 11/2018 | Osman | G06F 1/3231 | |
| 10,152,633 B2* | 12/2018 | Tomimori | G06F 3/013 | |
| 10,173,586 B1* | 1/2019 | Kashchenko | B60Q 1/346 | |
| 2005/0030184 A1* | 2/2005 | Victor | B60K 28/06 | 340/576 |
| 2010/0033333 A1* | 2/2010 | Victor | A61B 5/1114 | 340/576 |
| 2010/0049375 A1* | 2/2010 | Tanimoto | B62D 15/025 | 701/1 |
| 2012/0057749 A1* | 3/2012 | Takahashi | G08G 1/167 | 382/103 |
| 2014/0032072 A1* | 1/2014 | Yoshihama | B60T 7/22 | 701/70 |
| 2014/0129082 A1* | 5/2014 | Takahashi | B60K 35/00 | 701/36 |
| 2015/0154461 A1* | 6/2015 | Kitaura | G06K 9/00604 | 348/148 |
| 2016/0120403 A1* | 5/2016 | Mochizuki | A61B 3/0025 | 351/209 |
| 2017/0104907 A1* | 4/2017 | Rajhansa | H04N 5/23296 | |
| 2017/0190306 A1* | 7/2017 | Aoki | H04N 7/183 | |
| 2018/0111551 A1* | 4/2018 | Suzuki | G06K 9/00791 | |
| 2019/0143993 A1* | 5/2019 | Aoi | G06F 3/012 | 340/439 |

* cited by examiner

DRIVER CONDITION DETECTION SYSTEM

FIELD

The present invention relates to a driver condition detection system.

BACKGROUND

Known in the past is a device using an image capturing means provided at a vehicle to detect distracted driving or other conditions of a driver. For example, the distracted driving judgment device described in PTL 1 detects a line of sight of a driver from a facial image of the driver output by the image capturing means and judges that the driver is driving while distracted in the case where the detected line of sight is outside a predetermined range. Further, when a vehicle is driving along a curve, the above predetermined range is shifted by a predetermined amount in the curve direction.

CITATION LIST

Patent Literature

[PTL 1] Japanese Patent Publication No. 2012-058769A

SUMMARY

Technical Problem

A driver has to look at not only the direction of progression of the vehicle, but also other surrounding vehicles for checking safety. However, if shifting the threshold value range for judgment of distracted driving on a curve in the curve direction, a driver is liable to be judged to be driving while distracted if the driver looks at other surrounding vehicles when entering a curve.

Further, when there is a slope in the front in the direction of progression of the vehicle, the driver looks in a direction corresponding to the gradient of the slope in order to check the front. At this time, if the threshold value range is maintained, the look for checking the front is liable to be judged to be driving while distracted.

In consideration of this technical problem, an object of the present invention is to keep a driver from being mistakenly judged to be driving while distracted.

Solution to Problem

The summary of the present disclosure is as follows.

(1) A driver condition detection system comprising: a driver monitor camera capturing an image of a face of a driver of a vehicle to generate a facial image of the driver; a facial information detecting part configured to detect a facial orientation or a line of sight of the driver based on the facial image; a threshold value range setting part configured to set a threshold value range allowed as the facial orientation or the line of sight of the driver; a driver condition judging part configured to judge that the driver is driving while distracted if the facial orientation or the line of sight of the driver is maintained outside of the threshold value range for a predetermined time period or more; and a road discriminating part configured to discriminate a shape of a road ahead of the vehicle by a predetermined distance in a direction of progression of the vehicle, wherein the threshold value range setting part is configured to expand the threshold value range according to the shape discriminated by the road discriminating part.

(2) The driver condition detection system described in above (1), wherein if the shape discriminated by the road discriminating part is a curve, the threshold value range setting part is configured to expand the threshold value range by a predetermined amount in a direction of the curve.

(3) The driver condition detection system described in above (2), wherein the threshold value range setting part is configured to enlarge the predetermined amount if a radius of curvature of the curve is relatively small compared to if the radius of curvature is relatively large.

(4) The driver condition detection system described in any one of above (1) to (3), wherein if the shape discriminated by the road discriminating part is a slope, the threshold value range setting part is configured to expand the threshold value range by a predetermined amount in a gradient direction of the slope.

(5) The driver condition detection system described in above (4), wherein the threshold value range setting part is configured to enlarge the predetermined amount if a gradient of the slope is relatively large compared to if the gradient is relatively small.

(6) The driver condition detection system described in any one of above (1) to (5), further comprising a position detecting part configured to detect a relative positional relationship of a front vehicle running along another lane in the direction of progression of the vehicle and the vehicle, wherein the threshold value range setting part is configured to expand the threshold value range by a predetermined amount based on the relative positional relationship detected by the position detecting part.

(7) The driver condition detection system described in above (6), wherein the threshold value range setting part is configured to enlarge the predetermined amount if an angle formed by a direction of the front vehicle seen from the vehicle and the direction of progression of the vehicle is relatively large compared to if the angle is relatively small.

(8) The driver condition detection system described in above (6), wherein the threshold value range setting part is configured to enlarge the predetermined amount if a relative distance between the vehicle and the front vehicle is relatively short compared to if the relative distance is relatively long.

Advantageous Effects of Invention

According to the present invention, it is possible to keep a driver from being mistakenly judged to be driving while distracted.

DESCRIPTION OF EMBODIMENTS

Below, referring to the drawings, embodiments of the present invention will be explained in detail. Note that, in the following explanation, similar components are assigned the same reference notations.

First Embodiment

Figure 1:
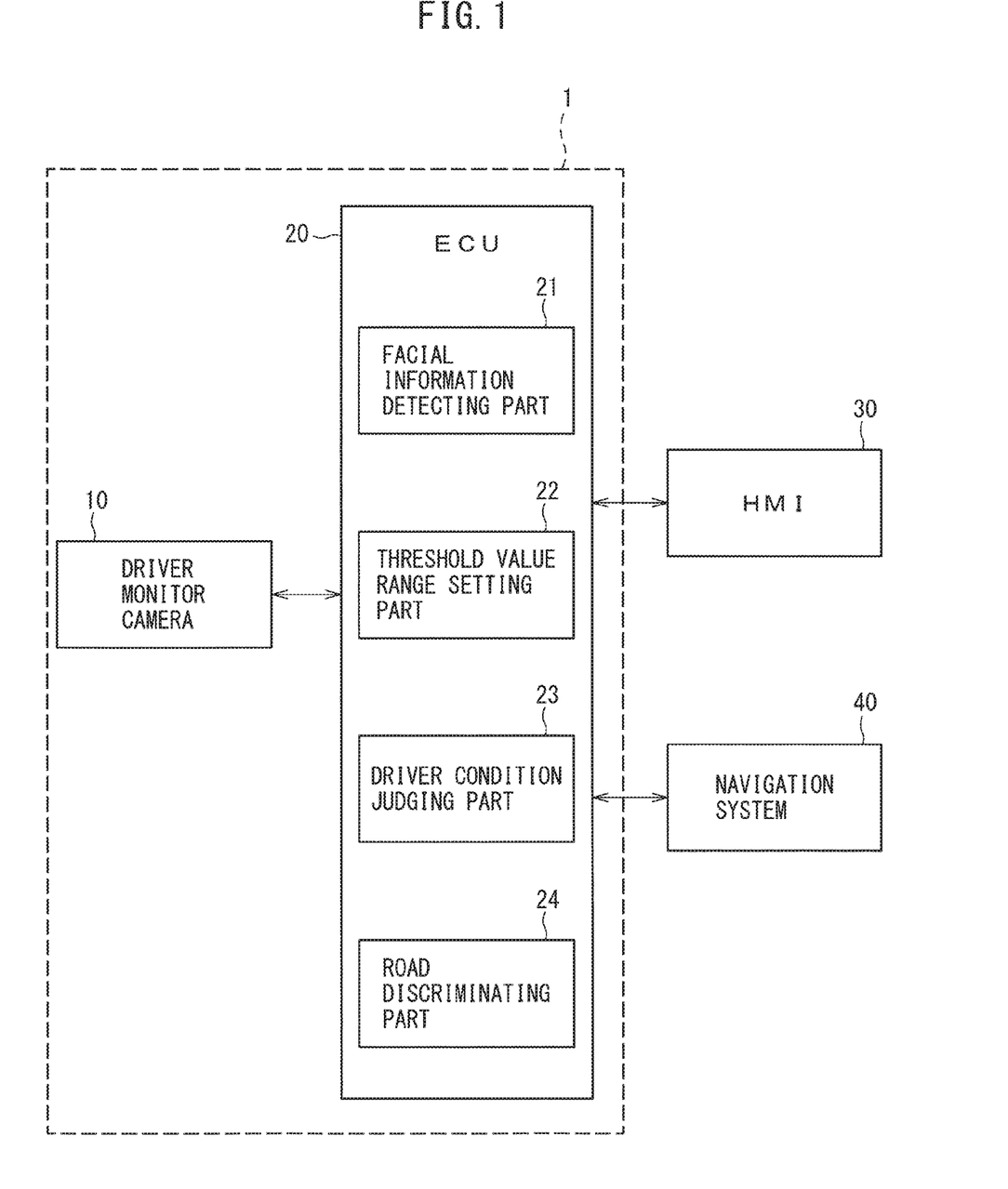
FIG. 1 is a block diagram showing the configuration of a driver condition detection system according to a first embodiment of the present invention.

Below, referring to FIG. 1 to FIG. 6, a first embodiment of the present invention will be explained. FIG. 1 is a block diagram showing the configuration of a driver condition detection system according to the first embodiment of the present invention. The driver condition detection system 1 is mounted in a vehicle and detects a condition of a driver of a vehicle. The driver condition detection system 1 comprises a driver monitor camera 10 and an electronic control unit (ECU) 20.

Figure 2:
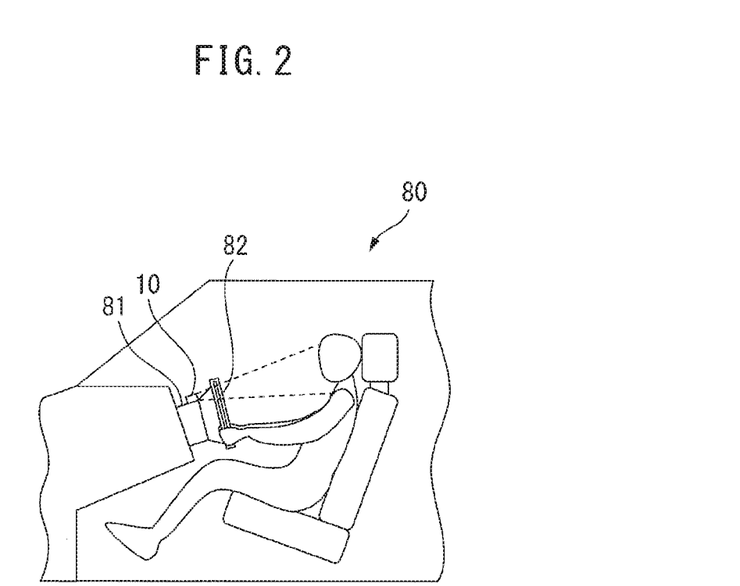
FIG. 2 is a view schematically showing the inside of a vehicle mounting a driver condition detection system.

FIG. 2 is a view schematically showing the inside of a vehicle mounting a driver condition detection system. The driver monitor camera 10 captures an image of the face of a driver of a vehicle 80 (host vehicle) to generate a facial image of the driver. The driver monitor camera 10 is provided at the inside of the vehicle 80. Specifically, as shown in FIG. 2, the driver monitor camera 10 is provided above a steering column 81 of the vehicle 80. FIG. 2 shows the range of projection of the driver monitor camera 10 by a broken line. Note that, the driver monitor camera 10 may be provided at the steering wheel 82, room mirror, meter panel, meter hood, etc., of the vehicle 80. Further, the driver condition detection system 1 may comprise a plurality of driver monitor cameras 10.

The driver monitor camera 10 is comprised of a camera and a projector. For example, the camera is a CMOS (complementary metal oxide semiconductor) camera or CCD (charge coupled device) camera, while the projector is an LED (light emitting diode). Further, to enable the face of the driver to be captured without giving the driver an unpleasant feeling even at the time of little light such as evening, preferably the projector is a near infrared LED. For example, the projector may comprise two near infrared LEDs arranged at the both sides of the camera. Further, the camera may be provided with a filter such as a visible light cutting filter. The facial image of the driver generated by the driver monitor camera 10 is sent from the driver monitor camera 10 to the ECU 20.

The ECU 20 is a microcomputer comprised of a memory such as a read only memory (ROM) and random access memory (RAM), a central processing unit (CPU), input port, output port, communication module, etc. In the present embodiment, one ECU 20 is provided, but a plurality of ECUs may be provided for the different functions. The ECU 20 comprises a facial information detecting part 21, threshold value range setting part 22, driver condition judging part 23, and road discriminating part 24.

The facial information detecting part 21 detects the facial information of the driver. Specifically, the facial information detecting part 21 detects the facial orientation or line of sight of the driver based on the facial image of the driver generated by the driver monitor camera 10.

The facial information detecting part 21, for example, detects the facial orientation of the driver by the following method. The facial information detecting part 21 stores in advance facial shape data when the driver is facing the front. The facial shape data may be data of the face of a general person or may be obtained for each driver. The facial shape data is stored in the memory of the ECU 20. The facial information detecting part 21 matches the generated facial image of the driver with the facial shape data. The facial information detecting part 21 rotates the facial image of the driver so that the rate of match of the two becomes maximum and detects the facial orientation of the driver from the angle of rotation when the rate of match becomes maximum.

Further, the facial information detecting part 21 may detect the facial orientation of the driver by the following method. The facial information detecting part 21 stores in advance a plurality of facial shape data of different facial orientations of the driver. The facial shape data may be data of the face of a general person or may be obtained for each driver. The facial shape data is stored in the memory of the ECU 20. The facial information detecting part 21 matches the generated facial image of the driver with the plurality of facial shape data. The facial information detecting part 21 detects the facial orientation of the facial shape data where the rate of match of the two becomes maximum as the facial orientation of the driver. Further, the facial information detecting part 21 may detect the facial orientation of the driver by another known means such as described in Japanese Patent Publication No. 2000-976762A or Japanese Patent Publication No. 2003-44853A.

The facial information detecting part 21, for example, detects the line of sight of the driver by the following method. The facial information detecting part 21 identifies the facial region from the generated facial image of the driver and extracts characteristic points of the face part such as the eyes, nose, and mouth so as to detect the face part. Further, the facial information detecting part 21 detects the positions of the Purkinje images (corneal reflex images) and the positions of the centers of the pupils and detects the line of sight of the driver based on the positional relationships between the Purkinje images and the positions of the centers of the pupils. Note that, the facial information detecting part 21 may detect the line of sight of the driver based on the positional relationships of the Purkinje images and the centers of the pupils and the detected facial orientation of the driver.

The threshold value range setting part 22 sets a threshold value range allowed as the facial orientation or line of sight of the driver. The threshold value range is set not only in the left-right direction (yaw direction), but also the up-down direction (pitch direction). There is an effective field of vision in the human eye, so the left side field of vision becomes narrower when the driver is facing the right side, and the right side field of vision becomes narrower when the driver is facing the left side. Therefore, in order for the driver to monitor a broad range in both the left and right directions, the driver has to face the front as much as possible.

For this reason, the threshold value range is usually set to a predetermined range centered about 0° (for example, ±15° in the left-right direction and ±15° in the up-down direction). However, the direction which the driver should look at for checking safety changes in accordance with the shape of the road on which the vehicle 80 is running. For example, if there is a curve in front of the vehicle 80 in the direction of progression, the driver must look beyond the curve by shifting his line of sight and facial orientation from the front so as to check for safety on the road. Further, if there is a slope in front of the vehicle 80 in the direction of progression, the driver must look beyond the slope by shifting his line of sight and facial orientation from the front so as to check for safety on the road.

For this reason, if the threshold value range is maintained in the above predetermined range, despite the driver checking for safety, the driver is liable to be judged to be driving while distracted and a warning is liable to be issued to the driver. Further, if shifting the threshold value range in the curve direction or gradient direction of the slope, the driver is liable to be judged as driving while distracted and a warning is liable to be issued to the driver if the driver looks at other surrounding vehicles when entering a curve or slope. For this reason, in the present embodiment, the threshold value range setting part 22 expands the threshold value range according to the shape of the road ahead of the vehicle 80 by a predetermined distance in the direction of progression of the vehicle 80. Due to this, it is possible to keep the driver from being misjudged to be driving while distracted.

For example, the threshold value range setting part 22 expands the threshold value range by a predetermined amount in the direction of the curve if the road shape is a curve. The predetermined amount is a preset value. Note that, the threshold value range setting part 22 may set the predetermined amount based on the radius of curvature of the curve. The smaller the radius of curvature of the curve, the sharper the degree of curvature of the curve becomes, so the greater the amount of movement of the facial orientation and the line of sight of the driver becomes. For this reason, the threshold value range setting part 22 may enlarge the predetermined amount if the radius of curvature of the curve is relatively small compared to if the radius of curvature of the curve is relatively large. By doing this, the threshold value range is set to a value corresponding to the radius of curvature of the curve, so at the time of entering a curve, a driver can be better kept from being mistakenly judged to be driving while distracted.

Further, the threshold value range setting part 22 expands the threshold value range by a predetermined amount in the gradient direction of the slope when the road shape is a slope. The predetermined amount is a preset value. Note that, the threshold value range setting part 22 may set the predetermined amount based on the gradient of the slope. The greater the gradient of the slope, the greater the amount of movement of the facial orientation and line of sight of the driver. For this reason, the threshold value range setting part 22 may enlarge the above predetermined amount when the gradient of the slope is relatively large compared to when the gradient of the slope is relatively small. Due to this, the threshold value range is set to a value corresponding to the gradient of the slope, so when entering a slope, it is possible to better keep the driver from being misjudged as driving while distracted.

The road shape is discriminated by the road discriminating part 24. The road discriminating part 24 discriminates the shape of the road ahead of the vehicle 80 by a predetermined distance in the direction of progression of the vehicle 80.

The vehicle 80 is provided with a navigation system 40. The information stored in the navigation system 40 is transmitted to the ECU 20. The navigation system 40 has a GPS receiver and detects the current position of the vehicle 80 by the GPS receiver. Further, the navigation system 40 stores map information. The map information includes positional information of the road, shape information of the road (for example, shape of the road such as curve or straight, radius of curvature of curve, road gradient, etc.), positional information of merging points, branching points, etc., road type, and other information etc.

The road discriminating part 24 discriminates the road shape based on the road information acquired by the navigation system 40. Note that, the road discriminating part 24 may discriminate the road shape based on the road information received from outside of the vehicle 80. For example, the road discriminating part 24 may receive road information by communication with an outside data center of the vehicle 80, vehicle-to-vehicle communication between the vehicle 80 and another vehicle, road-to-vehicle communication through a roadside device, etc.

The driver condition judging part 23 judges the condition of the driver. Specifically, the driver condition judging part 23 judges that the driver is driving while distracted if the facial orientation or line of sight of the driver is maintained outside of the threshold value range for a threshold value time period or more.

The driver condition judging part 23 issues a warning to the driver when judging that the driver is driving while distracted. For example, the driver condition judging part 23 issues a warning to the driver visually or audially through a human machine interface (HMI) 30. The HMI 30 is an interface for inputting and outputting information between the driver and the vehicle 80. The HMI 30, for example, is comprised of a display for displaying text or graphic information, a speaker for generating a sound, operating buttons, a touch panel, and microphone for the driver to enter instructions, etc.

<Processing for Setting Threshold Value Range>

Figure 3:
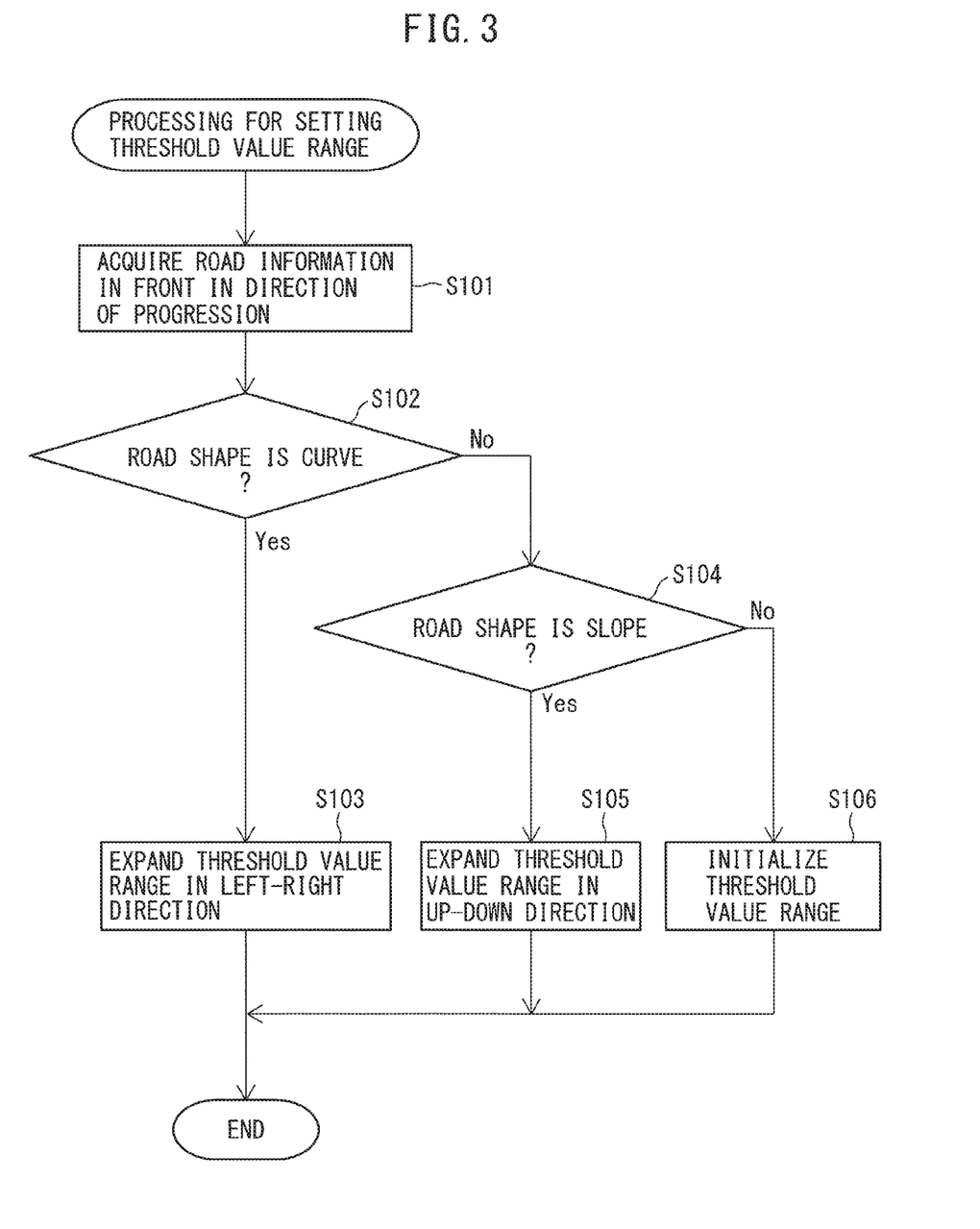
FIG. 3 is a flow chart showing a control routine of processing for setting a threshold value range in the first embodiment.

Below, referring to the flow charts of FIG. 3 and FIG. 4, the control using the driver condition detection system 1 to detect distracted driving by the driver will be explained in detail. FIG. 3 is a flow chart showing a control routine of processing for setting the threshold value range in the first embodiment. The present control routine is repeatedly performed by the ECU 20 at predetermined time intervals. In the present control routine, the threshold value range of the facial orientation or line of sight is set.

First, at step S101, the road discriminating part 24 acquires the information of the road ahead of the vehicle 80 by a predetermined distance in the direction of progression of the vehicle 80 from the navigation system 40 or outside of the vehicle 80. The predetermined distance is for example 100 to 800 m. Further, the predetermined distance may be the distance which the vehicle 80 reaches after a predetermined time period (for example 1 to 5 seconds).

Next, at step S102, the road discriminating part 24 judges whether the shape of the road ahead of the vehicle 80 by a predetermined distance in the direction of progression of the vehicle 80 is a curve based on the road information acquired at step S101. If it is judged that the road shape is a curve, the present control routine proceeds to step S103.

At step S103, the threshold value range setting part 22 expands the threshold value range in the left-right direction by a predetermined amount. The predetermined amount is a preset value. If the direction of the curve is the right, the right side (plus side) threshold value range is expanded. That is, the upper limit value of the threshold value range in the left-right direction is made larger (for example, changed from +15° to +45°). On the other hand, if the direction of the curve is the left, the left side (minus side) threshold value range is expanded. That is, the lower limit value of the threshold value range in the left-right direction is made smaller (for example, changed from −15° to −45°). After step S103, the present control routine is ended.

On the other hand, if at step S102 it is judged that the shape of the road is not a curve, the present control routine proceeds to step S104. At step S104, the road discriminating part 24 judges whether the shape of the road ahead of the vehicle 80 by a predetermined distance in the direction of progression of the vehicle 80 is a slope based on the road information acquired at step S101. If it is judged that the road shape is a slope, the present control routine proceeds to step S105.

At step S105, the threshold value range setting part 22 enlarges the threshold value range in the up-down direction by a predetermined amount. The predetermined amount is a preset value. If the direction of the gradient of the slope is upward, that is, if the shape of the road is an upward slope, the threshold value range of the upper side (plus side) is expanded. That is, the upper limit value of the threshold value range in the up-down direction is made larger (for example, changed from +15° to +45°). On the other hand, if the direction of the gradient of the slope is downward, that is, if the shape of the road is a downward slope, the threshold value range of the lower side (minus side) is expanded. That is, the lower limit value of the threshold value range in the up-down direction is made smaller (for example, changed from −15° to −45°). After step S105, the present control routine ends.

On the other hand, if at step S104 it is judged that the shape of the road is not a slope, the present control routine proceeds to step S106. At step S106, the threshold value range setting part 22 initializes the threshold value range. That is, the threshold value range is returned to the original value before expansion and is set to a predetermined range centered about 0° (for example, ±15° in the left-right direction and ±15° in the up-down direction). After step S106, the present control routine is ended.

Figure 4:
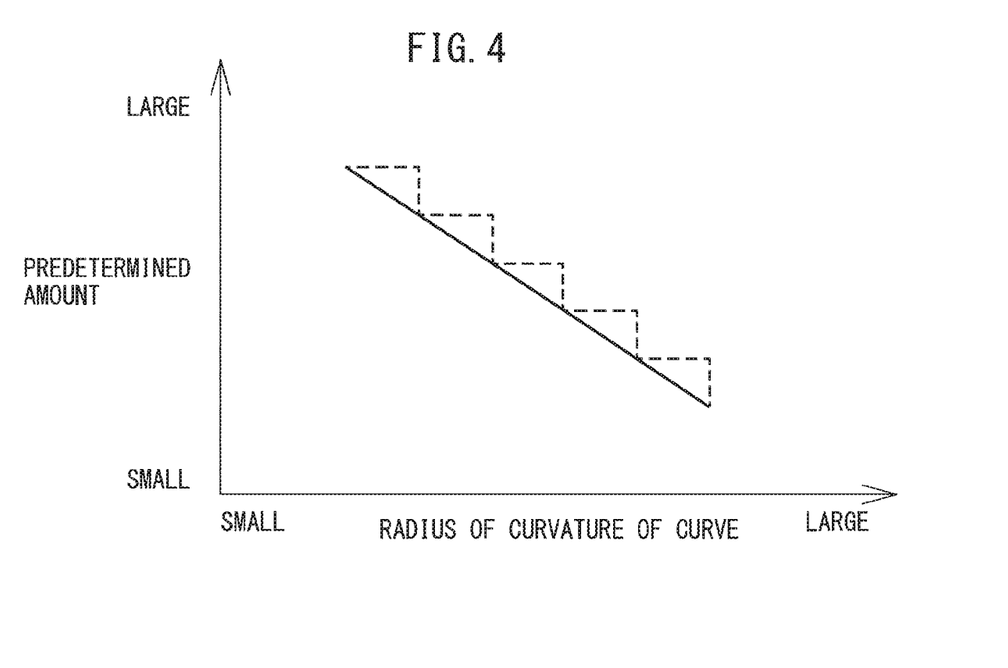
FIG. 4 is a map showing a relationship of a radius of curvature of a curve and a predetermined amount.

Note that, the threshold value range setting part 22 may use a map such as shown in FIG. 4 to set the predetermined amount when expanding the threshold value range in the left-right direction by a predetermined amount at step S103. In this map, the predetermined amount is shown as a function of the radius of curvature of the curve. The predetermined amount is linearly made larger as the radius of curvature becomes smaller. Note that, the predetermined amount may be made larger in stages (in steps) as the radius of curvature becomes smaller as shown by the broken line in FIG. 4.

Figure 5:
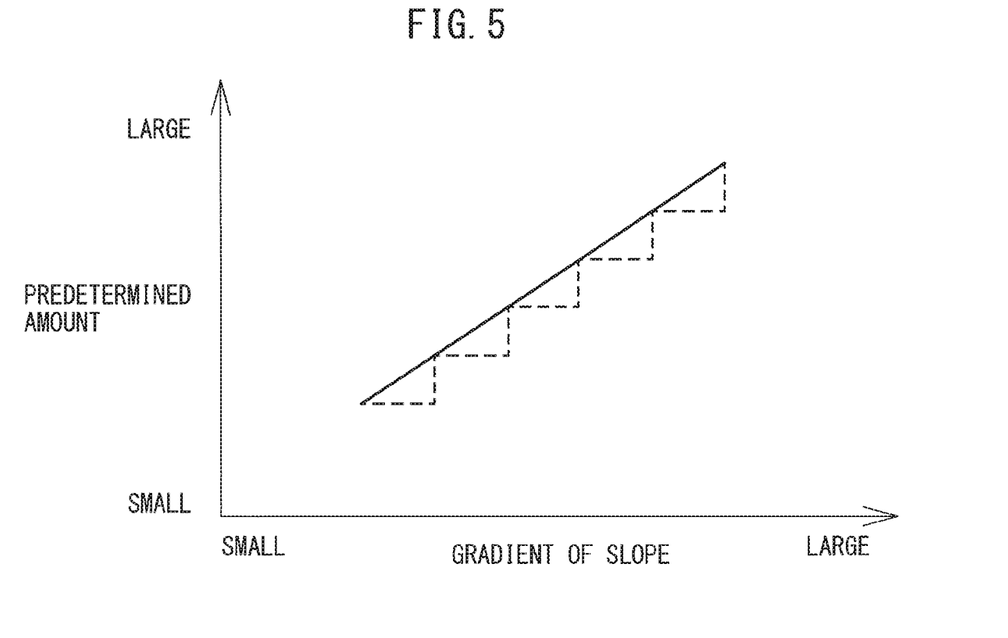
FIG. 5 is a map showing a relationship of a gradient of a slope and a predetermined amount.

Further, the threshold value range setting part 22 may use a map such as shown in FIG. 5 to set the predetermined amount when expanding the threshold value range in the up-down direction by a predetermined amount at step S105. In this map, the predetermined amount is shown as a function of the gradient of a slope. The predetermined amount is enlarged linearly as the gradient of the slope becomes larger. Note that, the predetermined amount, as shown by the broken line in FIG. 5, may be made larger in stages (in steps) as the gradient of the slope becomes larger.

Further, step S102 and step S103 or step S104 and step S105 may be omitted.

<Processing for Judging Driver Condition>

Figure 6:
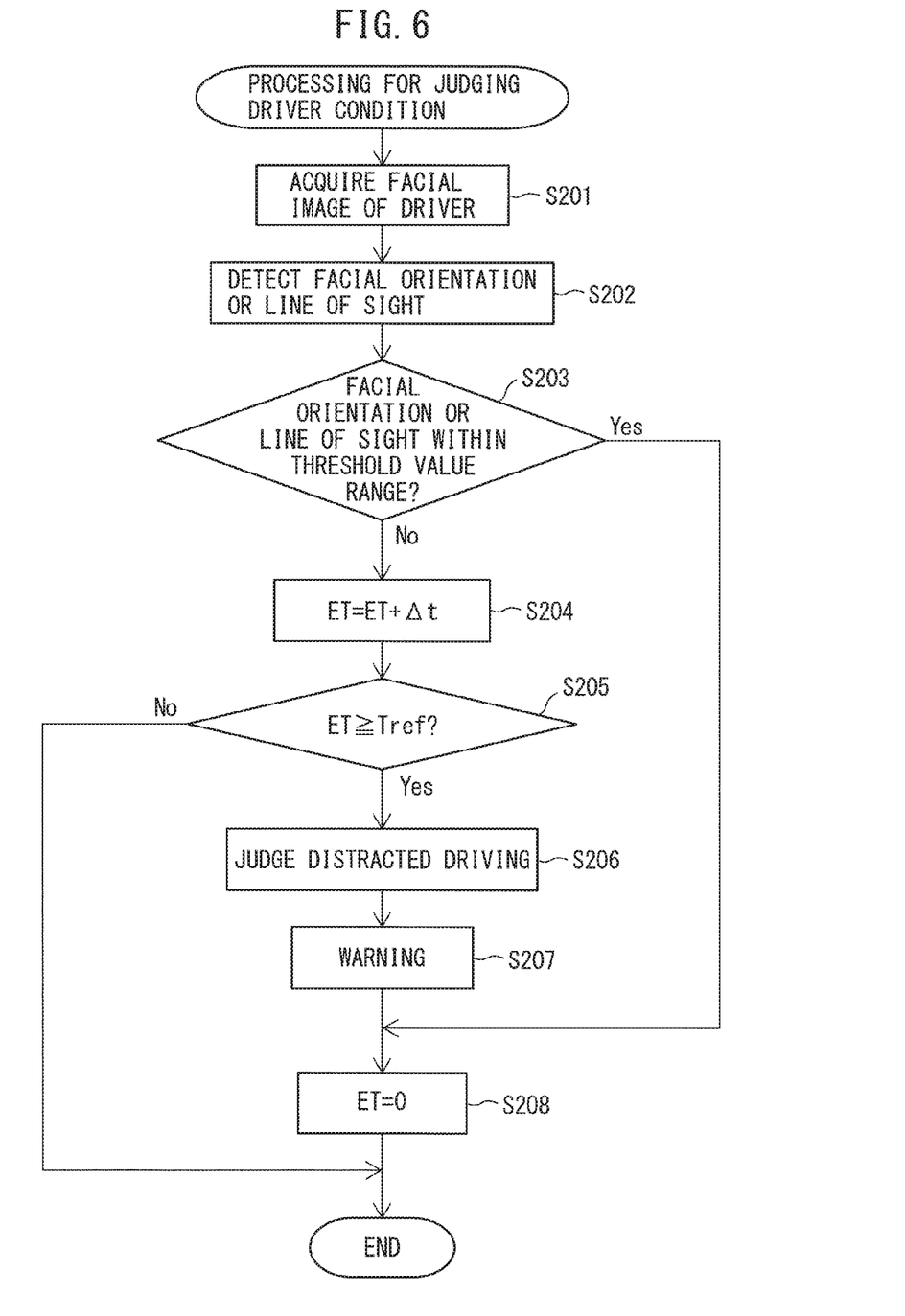
FIG. 6 is a flow chart showing a control routine of processing for judging a driver condition in the first embodiment.

FIG. 6 is a flow chart showing a control routine of processing for judging a driver condition in the first embodiment. The present control routine is repeatedly performed by the ECU 20 at predetermined time intervals. In the present control routine, it is judged whether the driver is driving while distracted.

First, at step S201, the facial information detecting part 21 acquires the facial image of the driver from the driver monitor camera 10. The facial image of the driver is obtained by the driver monitor camera 10.

Next, at step S202, the facial information detecting part 21 detects the facial orientation or line of sight of the driver based on the facial image of the driver. For example, the facial orientation or line of sight of the driver is detected by any of the above methods.

Next, at step S203, the driver condition judging part 23 judges whether the facial orientation or line of sight of the driver is within a threshold value range. The threshold value range is set by the threshold value range setting part 22 in the control routine of FIG. 3. If it is judged that the facial orientation or line of sight of the driver is within the threshold value range, the present control routine proceeds to step S208. At step S208, the driver condition judging part 23 resets the cumulative time period ET to zero. After step S208, the present control routine ends.

On the other hand, if at step S203 it is judged that the facial orientation or line of sight is outside of the threshold value range, the present control routine proceeds to step S204. At step S204, the driver condition judging part 23 updates the cumulative time period ET. Specifically, the value of the cumulative time period ET plus a fine time period Δt is made the new cumulative time period ET. The cumulative time period ET is the time period during which the facial orientation or line of sight of the driver is maintained outside of the threshold value range. The initial value of the cumulative time period ET is zero. Further, the fine time period Δt is a value corresponding to the interval between executions of the present control routine.

Next, at step S205, the driver condition judging part 23 judges whether the cumulative time period ET is the threshold value time period Tref or more. The threshold value time period Tref is preset and is, for example, 1 to 5 seconds. If it is judged that the cumulative time period ET is less than the threshold value time period Tref, the present control routine ends.

On the other hand, if it is judged that the cumulative time period ET is the threshold value time period Tref or more, the present control routine proceeds to step S206. At step S206, the driver condition judging part 23 judges that the driver is driving while distracted. Next, at step S207, the driver condition judging part 23 issues a warning to the driver through the HMI 30. Next, at step S208, the driver condition judging part 23 resets the cumulative time period ET to zero. After step S208, the present control routine ends.

Second Embodiment

The configuration and control of the driver condition detection system according to the second embodiment are basically similar to the configuration and control of the driver condition detection system according to the first embodiment except for the points explained below. For this reason, below, the second embodiment of the present invention will be explained focusing on parts different from the first embodiment.

Figure 7:
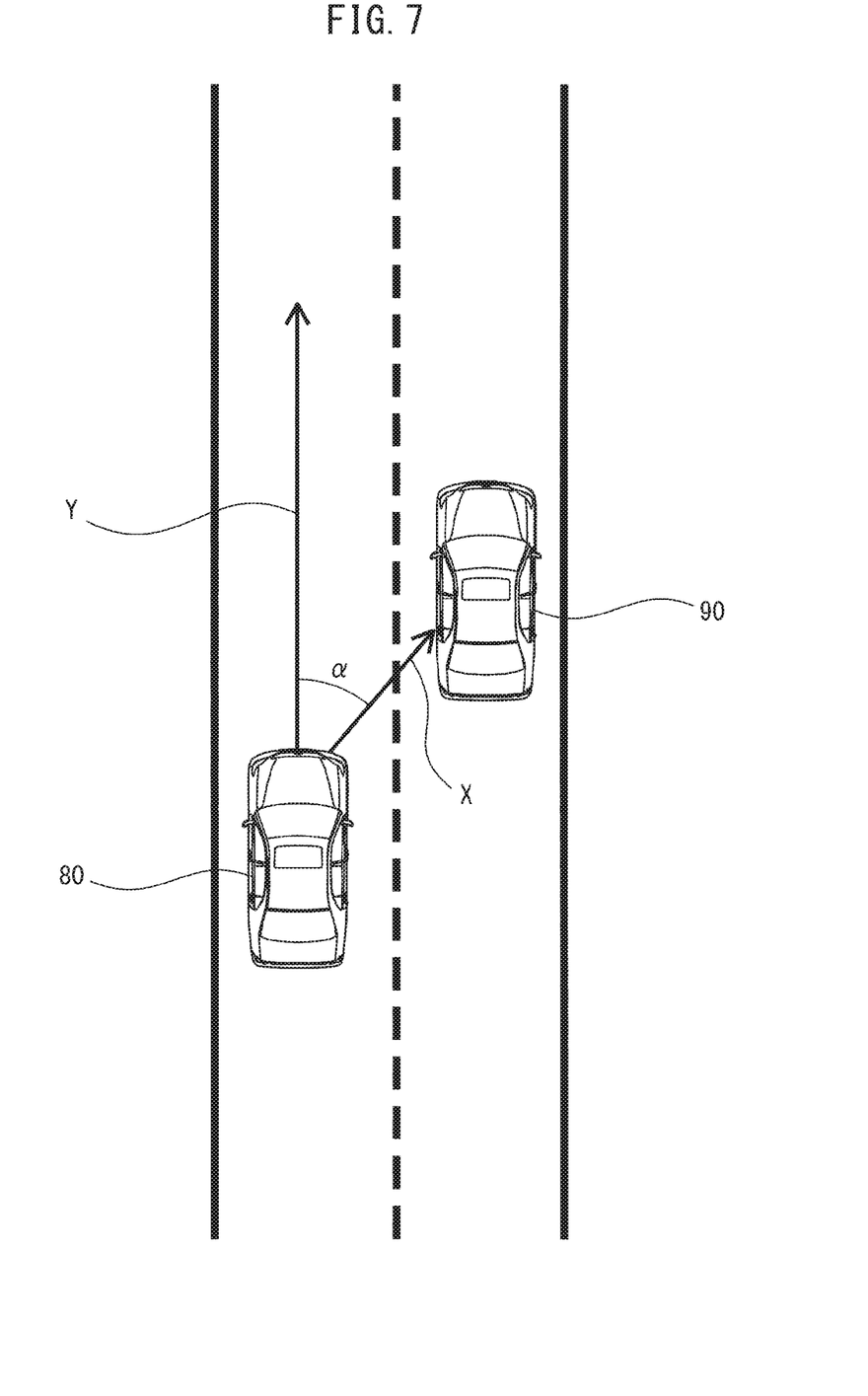
FIG. 7 is a view showing one example of a positional relationship of a host vehicle and a front vehicle.

FIG. 7 is a view showing one example of the positional relationship of the host vehicle and the front vehicle. If there is a front vehicle 90 running along the direction of progression of the vehicle 80 (host vehicle) in another lane, there is a possibility of the front vehicle 90 changing a lane etc., so the driver has to monitor the front vehicle 90. However, if the threshold value range of the facial orientation or line of sight is maintained in a predetermined range, regardless of the driver monitoring the front vehicle 90, the driver is liable to be judged as driving while distracted and a warning is liable to be issued to the driver. For this reason, in the second embodiment, the threshold value range is expanded by a predetermined amount based on the relative positional relationship of the front vehicle 90 running along the direction of progression of the vehicle 80 in another lane and the vehicle 80.

Figure 8:
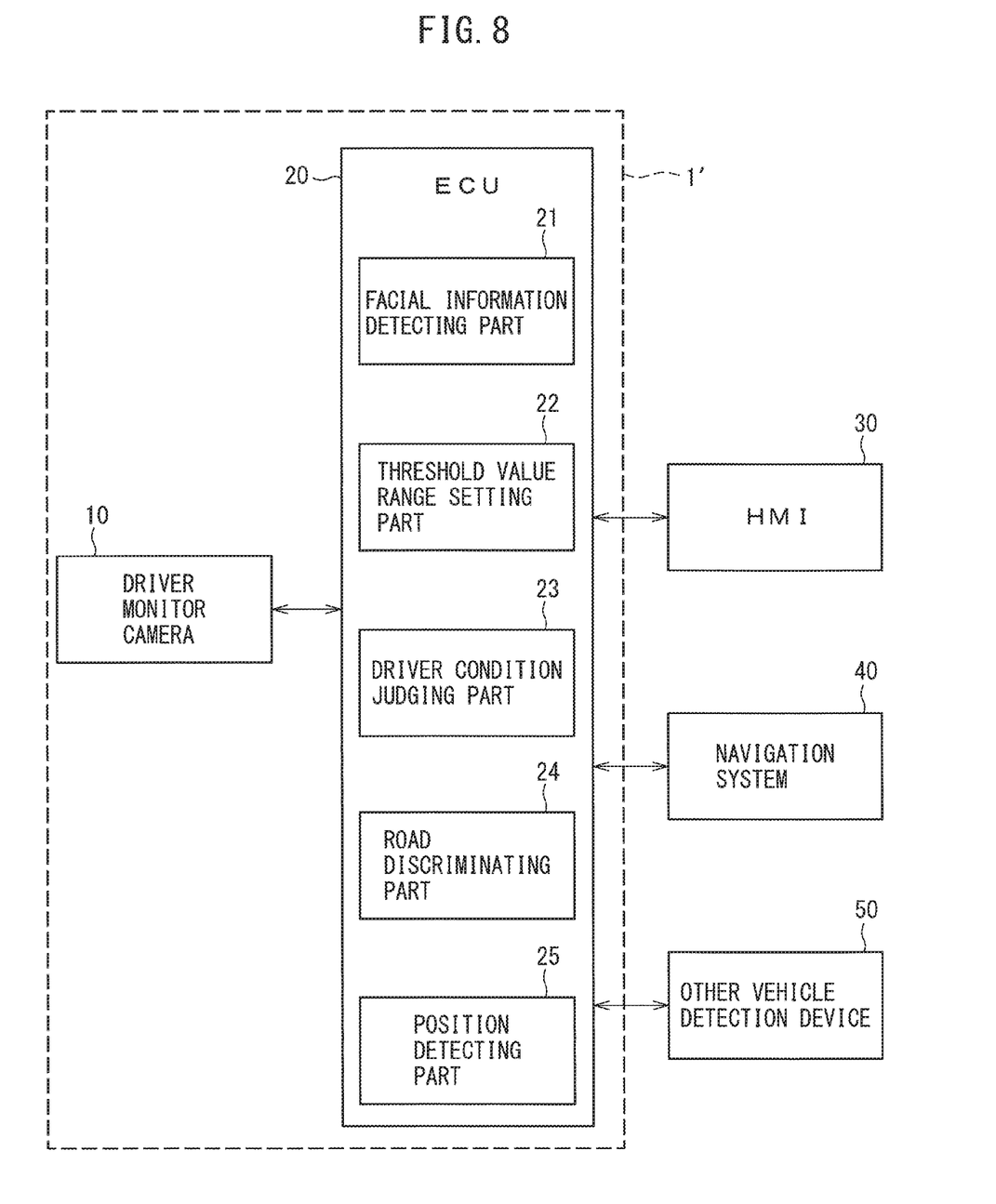
FIG. 8 is a block diagram showing the configuration of a driver condition detection system according to a second embodiment of the present invention.

FIG. 8 is a block diagram showing the configuration of a driver condition detection system according to the second embodiment of the present invention. The driver condition detection system 1' comprises a driver monitor camera 10 and an electronic control unit (ECU) 20. The ECU 20 comprises a facial information detecting part 21, threshold value range setting part 22, driver condition judging part 23, road discriminating part 24, and position detecting part 25. Further, the vehicle 80 comprises an HMI 30, navigation system 40, and other vehicle detection device 50.

The other vehicle detection device 50 detects another vehicle around the vehicle 80. The other vehicle detection device 50, for example, is at least one of a milliwave radar, laser radar, stereo camera, etc. The output of the other vehicle detection device 50 is sent to the ECU 20. The position detecting part 25 detects the relative positional relationship between the front vehicle 90 running in another lane in the direction of progression of the vehicle 80 and the vehicle 80 based on the output of the other vehicle detection device 50.

The threshold value range setting part 22 expands the threshold value range by a predetermined amount based on the relative positional relationship between the front vehicle 90 and the vehicle 80 detected by the position detecting part 25. Due to this, the threshold value range is set to a value corresponding to the relative positional relationship between the front vehicle 90 and the vehicle 80, so at the time of monitoring the front vehicle 90, the driver can be kept from misjudging distracted driving.

For example, the threshold value range setting part 22 enlarges the predetermined amount if the angle α formed by the direction X of the front vehicle 90 seen from the vehicle 80 and the direction of progression Y of the vehicle 80 is relatively large compared to if the angle α is relatively small. Note that, the direction X is a straight line connecting any point of the front vehicle 90 able to be seen from the vehicle 80 and a point near the driver's seat of the vehicle 80. The position detecting part 25 calculates the angle α based on the output of the other vehicle detection device 50.

Further, basically, the shorter the relative distance between the vehicle 80 and the front vehicle 90, the larger the angle α becomes. For this reason, the threshold value range setting part 22 may make the predetermined amount larger if the relative distance between the vehicle 80 and the front vehicle 90 is relatively short compared to if the relative distance is relatively long.

<Processing for Setting Threshold Value Range>

Figure 9:
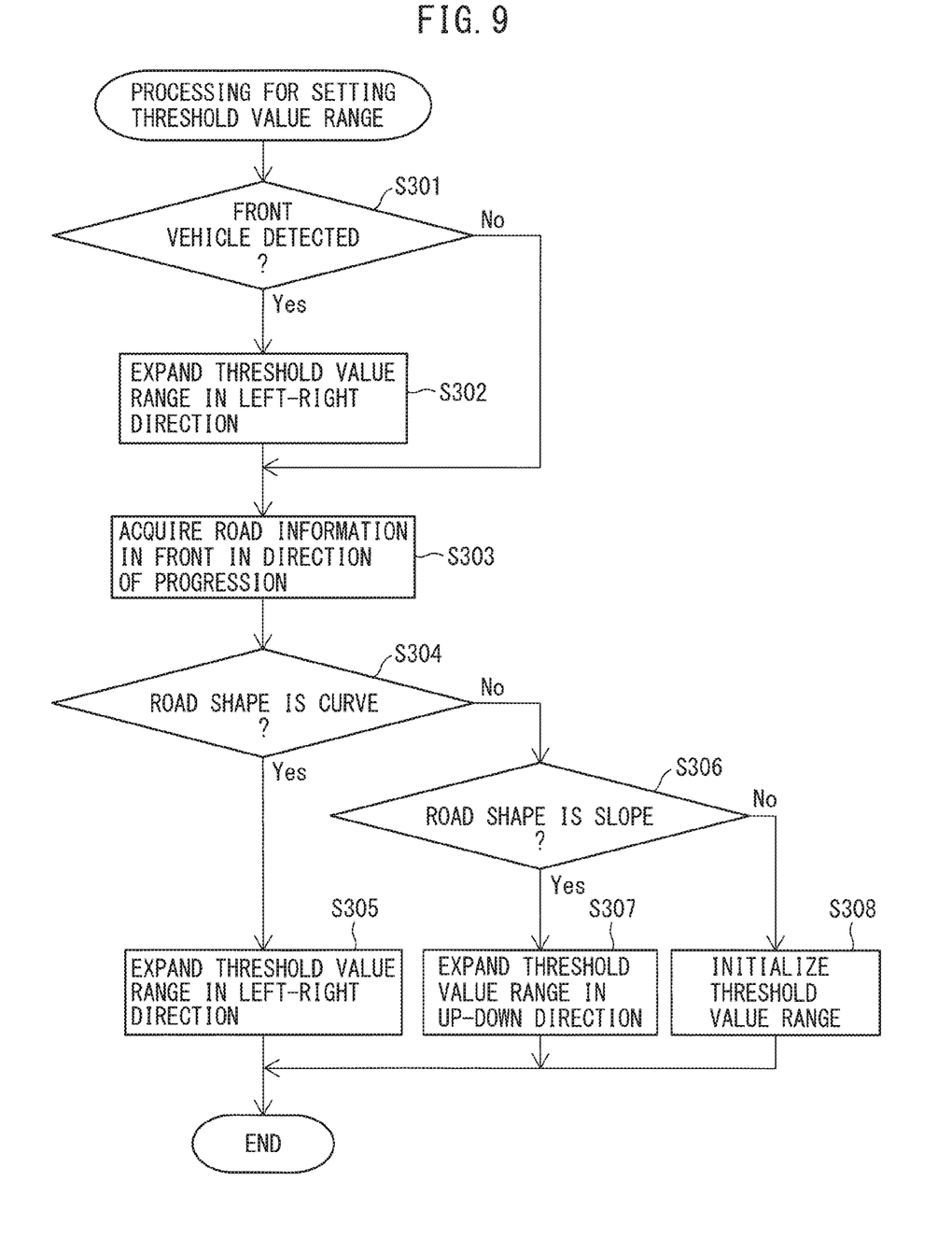
FIG. 9 is a flow chart showing a control routine of processing for setting a threshold value range in the second embodiment.

FIG. 9 is a flow chart showing a control routine of processing for setting a threshold value range in the second embodiment. The present control routine is repeatedly performed by the ECU 20 at predetermined time intervals. In the present control routine, the threshold value range of the facial orientation or line of sight is set.

Figure 10:
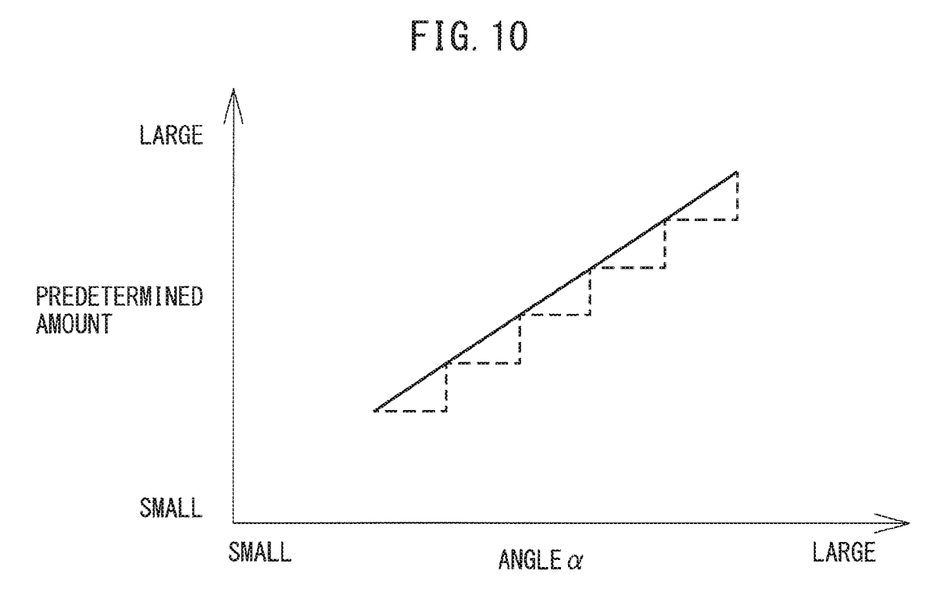
FIG. 10 is a map showing a relationship of an angle formed by a direction of a front vehicle seen from a vehicle and a direction of progression of a vehicle and a predetermined amount.

First, at step S301, the position detecting part 25 judges whether a front vehicle 90 has been detected. If it is judged that a front vehicle 90 has been detected, the present control routine proceeds to step S302. At step S302, the threshold value range setting part 22 expands the threshold value range in the left-right direction by a predetermined amount. The threshold value range setting part 22 uses a map such as shown in FIG. 10 to set the predetermined amount. In this map, the predetermined amount is shown as a function of the angle α. The predetermined amount is enlarged linearly as the angle α becomes larger. Note that, the predetermined amount, as shown by the broken line in FIG. 10, may be made larger in stages (in steps) as the angle α becomes larger.

Figure 11:
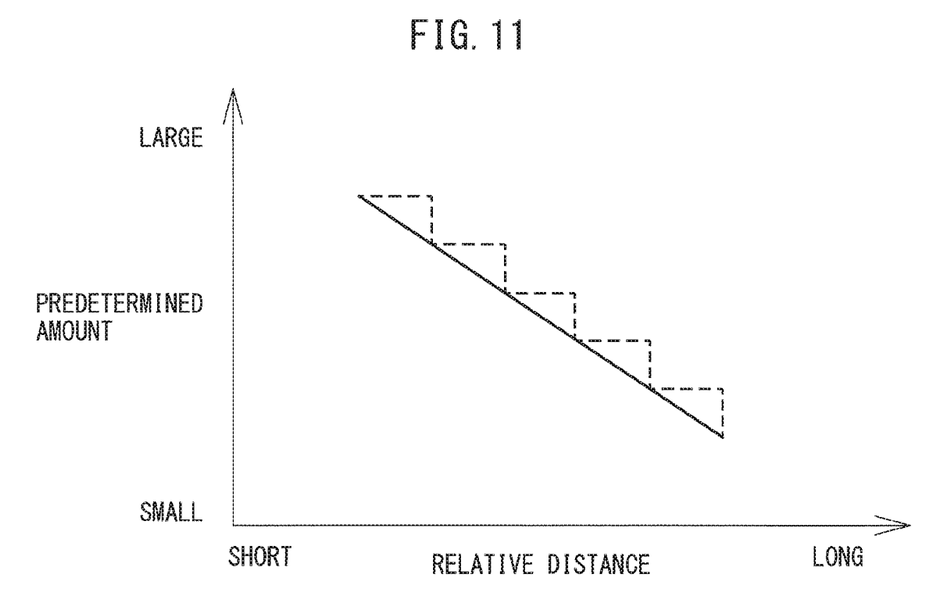
FIG. 11 is a map showing a relationship of a relative distance between a vehicle and a front vehicle and a predetermined amount.

Further, the threshold value range setting part 22 may use a map such as shown in FIG. 11 to set a predetermined amount. In this map, the predetermined amount is shown as a function of the relative distance between the vehicle 80 and the front vehicle 90. The predetermined amount is made larger linearly as the relative distance becomes shorter. Note that, the predetermined amount, as shown by the broken line in FIG. 11, may be made larger in stages (in steps) as the relative distance becomes shorter.

After step S302, the present control routine proceeds to step S303. On the other hand, if at step S301 it is judged that no front vehicle 90 has been detected, the present control routine skips step S302 and proceeds to step S303. Step S303 to step S308 are similar to step S101 to step S106 of FIG. 3, so explanations will be omitted.

Note that, in the second embodiment as well, in the same way as the first embodiment, a control routine of processing for judging the driver condition of FIG. 6 is performed.

Above, preferred embodiments according to the present invention were explained, but the present invention is not limited to these embodiments and can be modified and changed in various ways within the language of the claims.

REFERENCE SIGNS LIST 1, 1' driver condition detection system
10 driver monitor camera
20 electronic control unit (ECU)
21 facial information detecting part
22 threshold value range setting part
23 driver condition judging part
24 road discriminating part
25 position detecting part
80 vehicle

The invention claimed is:

1. A driver condition detection system comprising:
a driver monitor camera capturing an image of a face of a driver of a vehicle to generate a facial image of the driver,
a facial information detecting part configured to detect a facial orientation or a line of sight of the driver based on the facial image;
a threshold value range setting part configured to set a threshold value range allowed as the facial orientation or the line of sight of the driver,
a driver condition judging part configured to judge that the driver is driving while distracted if the facial orientation or the line of sight of the driver is maintained outside of the threshold value range for a predetermined time period or more; and a road discriminating part configured to discriminate a shape of a road ahead of the vehicle by a predetermined distance in a direction of progression of the vehicle, wherein the threshold value range setting part is configured to expand the threshold value range according to the shape discriminated by the road discriminating part, wherein if the shape discriminated by the road discriminating part is a slope, the threshold value range setting part is configured to expand the threshold value range by a predetermined amount in a gradient direction of the slope.

2. The driver condition detection system according to claim 1, wherein if the shape discriminated by the road discriminating part is a curve, the threshold value range setting part is configured to expand the threshold value range by a predetermined amount in a direction of the curve.

3. The driver condition detection system according to claim 2, wherein the threshold value range setting part is configured to increase the predetermined amount as a radius of curvature of the curve decreases.

4. The driver condition detection system according to claim 1, wherein the threshold value range setting part is configured to increase the predetermined amount as a gradient of the slope decreases.

5. The driver condition detection system according to claim 1, further comprising a position detecting part configured to detect a relative positional relationship of a front vehicle, which is running along another lane in the direction of progression of the vehicle, and the vehicle, wherein the threshold value range setting part is configured to expand the threshold value range by a predetermined amount based on the relative positional relationship detected by the position detecting part.

6. The driver condition detection system according to claim 5, wherein the threshold value range setting part is configured to increase the predetermined amount as an angle formed by a direction of the front vehicle seen from the vehicle and the direction of progression of the vehicle.

7. The driver condition detection system according to claim 5, wherein the threshold value range setting part is configured to increase the predetermined amount as a relative distance between the vehicle and the front vehicle decreases.

* * * * *